US009806623B2

(12) United States Patent
Grosso et al.

(10) Patent No.: US 9,806,623 B2
(45) Date of Patent: Oct. 31, 2017

(54) DC-DC CONVERTER WITH MULTIPLE OUTPUTS

(75) Inventors: Renato Grosso, Genoa (IT); Alessandro Da Canal, Genoa (IT); Luca Fanucci, Pisa (IT); Antonio Frello, Pisa (IT); Stefano Rissotto, Genoa (IT); Sergio Saponara, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 148 days.

(21) Appl. No.: 14/360,034

(22) PCT Filed: Jan. 25, 2012

(86) PCT No.: PCT/EP2012/051074
§ 371 (c)(1),
(2), (4) Date: Jan. 26, 2015

(87) PCT Pub. No.: WO2013/083296
PCT Pub. Date: Jun. 13, 2013

(65) Prior Publication Data
US 2015/0131333 A1    May 14, 2015

(30) Foreign Application Priority Data
Dec. 9, 2011    (EP) .................................... 11192740

(51) Int. Cl.
*H02M 3/335*    (2006.01)
(52) U.S. Cl.
CPC ... *H02M 3/33515* (2013.01); *H02M 3/33561* (2013.01); *H02M 3/33576* (2013.01)
(58) Field of Classification Search
CPC ............ H02M 1/34; H02M 1/36; H02M 3/24; H02M 2001/007; H02M 2001/008; H02M 2001/0006; H02M 2001/342
See application file for complete search history.

(56) References Cited

U.S. PATENT DOCUMENTS 5,162,663 A * 11/1992 Combs .................... H02J 9/061
  307/29
6,130,828 A * 10/2000 Rozman ............ H02M 3/33561
  363/21.06
(Continued)

FOREIGN PATENT DOCUMENTS

WO    WO-2011/141785    11/2011

OTHER PUBLICATIONS

PCT International Search Report for PCT Counterpart Application No. PCT/EP2012/051074, (Jul. 18, 2013), 5 pages.
(Continued)

*Primary Examiner* — Timothy J Dole
*Assistant Examiner* — Yusef Ahmed
(74) *Attorney, Agent, or Firm* — Nicholson De Vos Webster & Elliott LLP

(57) ABSTRACT

A multiple output DC-DC converter comprises a transformer, a primary circuit, a plurality of secondary circuits, and a controller. The transformer has a primary and at least one secondary winding. The primary circuit connects to a DC power supply source and includes the primary winding of the transformer and a primary switch connected in series. The plurality of secondary circuits includes the at least one secondary winding of the transformer, wherein each secondary circuit provides a DC power supply output, and at least one of the secondary circuits has a secondary switch. The controller monitors an output signal of each secondary circuit and controls operation of the primary and secondary switches based on the monitored signals. The controller co-ordinates operation of the secondary switch with the primary switch, such that the primary switch and the secondary switch are switched on simultaneously, or with a controlled offset.

15 Claims, 11 Drawing Sheets

(56) References Cited

U.S. PATENT DOCUMENTS

| | | | | |
|---|---|---|---|---|
| 6,324,081 | B1* | 11/2001 | Sakamoto | H02M 3/33561 348/E3.035 |
| 6,369,525 | B1* | 4/2002 | Chang | H02M 3/33561 315/278 |
| 6,373,722 | B1* | 4/2002 | Malik | H02M 3/33576 363/16 |
| 6,452,367 | B2* | 9/2002 | Watanabe | H02M 3/33561 323/267 |
| 6,456,511 | B1* | 9/2002 | Wong | H02M 1/36 363/21.13 |
| 6,504,267 | B1* | 1/2003 | Giannopoulos | H02M 3/33561 307/31 |
| 6,845,018 | B2* | 1/2005 | Ohishi | H02M 3/33507 363/21.06 |
| 7,391,626 | B1* | 6/2008 | Lin | H02M 3/33561 363/15 |
| 7,906,868 | B2* | 3/2011 | Ferguson | H02M 3/3353 307/31 |
| 7,923,943 | B2* | 4/2011 | Peker | H05B 33/0872 315/257 |
| 7,940,538 | B2* | 5/2011 | Kwon | H02M 3/33561 363/127 |
| 8,284,575 | B2* | 10/2012 | Inamura | H02M 1/08 318/800 |
| 8,593,834 | B2* | 11/2013 | Duvnjak | H02M 3/33561 363/21.1 |
| 2004/0070997 | A1* | 4/2004 | Hung | H02M 1/34 363/21.06 |
| 2005/0111242 | A1* | 5/2005 | Oh | H02M 3/33515 363/21.07 |
| 2006/0033650 | A1* | 2/2006 | Leung | H02M 3/33515 341/143 |
| 2007/0046105 | A1* | 3/2007 | Johnson | H02M 3/33561 307/29 |
| 2007/0085720 | A1* | 4/2007 | Fosler | H02M 3/33515 341/155 |
| 2007/0121350 | A1* | 5/2007 | Duvnjak | H02M 3/33561 363/21.01 |
| 2008/0037297 | A1* | 2/2008 | Torre | H02M 3/33515 363/41 |
| 2008/0042632 | A1* | 2/2008 | Chapuis | H02M 3/157 323/283 |
| 2008/0238750 | A1* | 10/2008 | Kris | G05B 19/414 341/155 |
| 2008/0252277 | A1* | 10/2008 | Sase | H02M 3/157 323/283 |
| 2009/0116601 | A1* | 5/2009 | Kim | G11C 7/22 375/371 |
| 2009/0134702 | A1* | 5/2009 | Duvnjak | H02M 3/33561 307/31 |
| 2009/0135885 | A1* | 5/2009 | Lin | H04B 1/69 375/130 |
| 2010/0164279 | A1* | 7/2010 | Dishman | H02M 3/33561 307/17 |
| 2010/0290255 | A1* | 11/2010 | Duvnjak | H02M 3/33561 363/21.1 |
| 2011/0002146 | A1* | 1/2011 | Kyono | H02M 3/33507 363/21.12 |
| 2011/0006937 | A1* | 1/2011 | Zoso | H03M 3/422 341/143 |
| 2011/0007527 | A1* | 1/2011 | Liu | H02M 3/33561 363/21.02 |
| 2011/0141780 | A1* | 6/2011 | O'Malley | H02M 3/33515 363/123 |
| 2011/0141785 | A1* | 6/2011 | Duan | H02M 7/4807 363/131 |
| 2012/0218784 | A1* | 8/2012 | Duvnjak | H02M 3/33561 363/21.1 |
| 2012/0313433 | A1* | 12/2012 | Uno | H02M 3/33561 307/31 |
| 2013/0021827 | A1* | 1/2013 | Ye | H03F 1/025 363/17 |
| 2014/0140106 | A1* | 5/2014 | Duan | H02M 3/33592 363/21.06 |

OTHER PUBLICATIONS

International Preliminary Report on Patentability, Application No. PCT/EP2012/051074, dated Jun. 19, 2014, 14 pages.
Written Opinion of the International Searching Authority, Application No. PCT/EP2012/051074, dated Jun. 9, 2014, 12 pages.
Communication pursuant to Article 94(3) EPC for European Application No. 12701993.3, mailed Mar. 1, 2017, 5 pages.

* cited by examiner

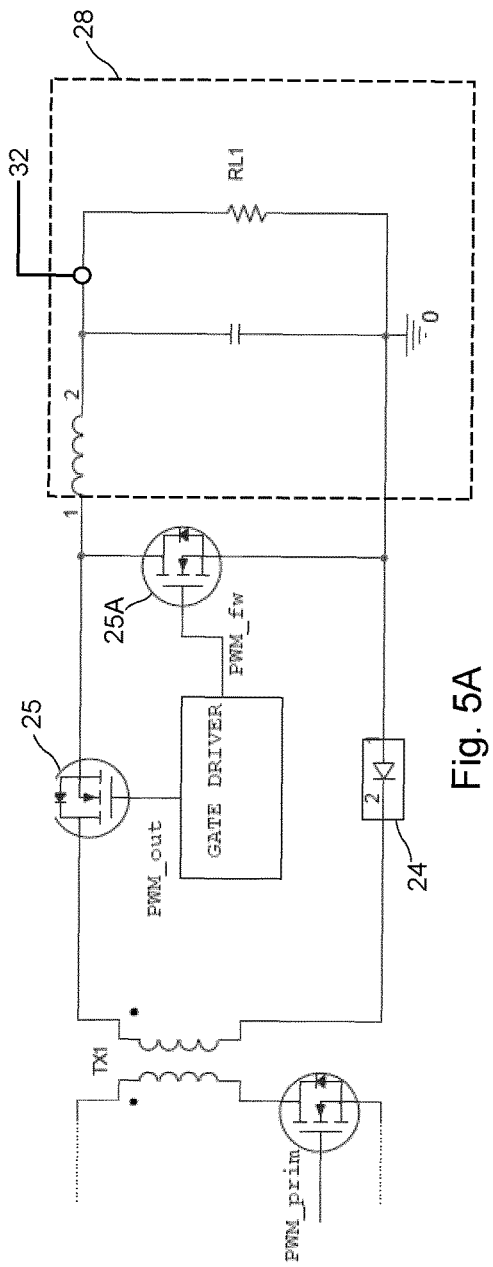
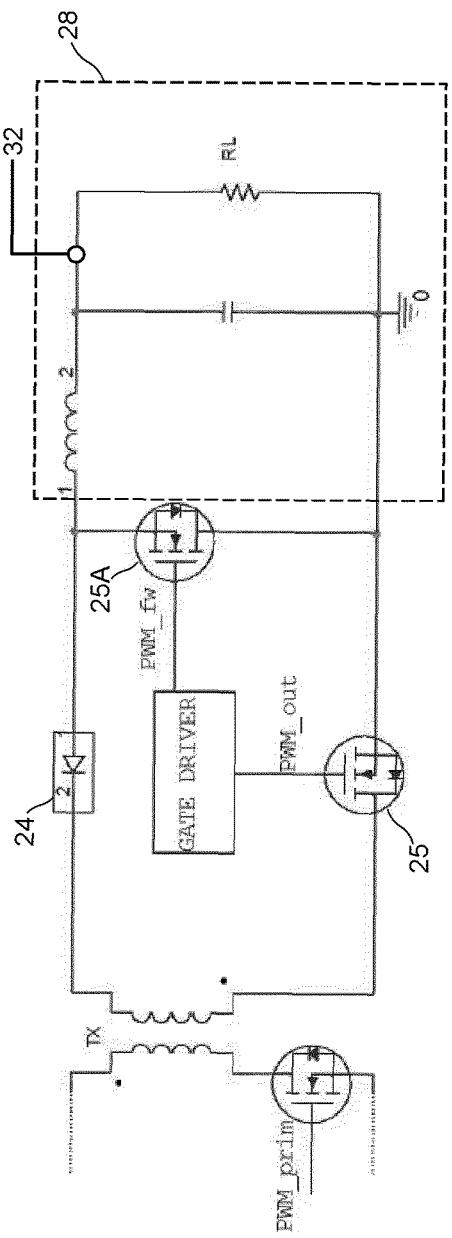
Fig. 5A
Fig. 5B

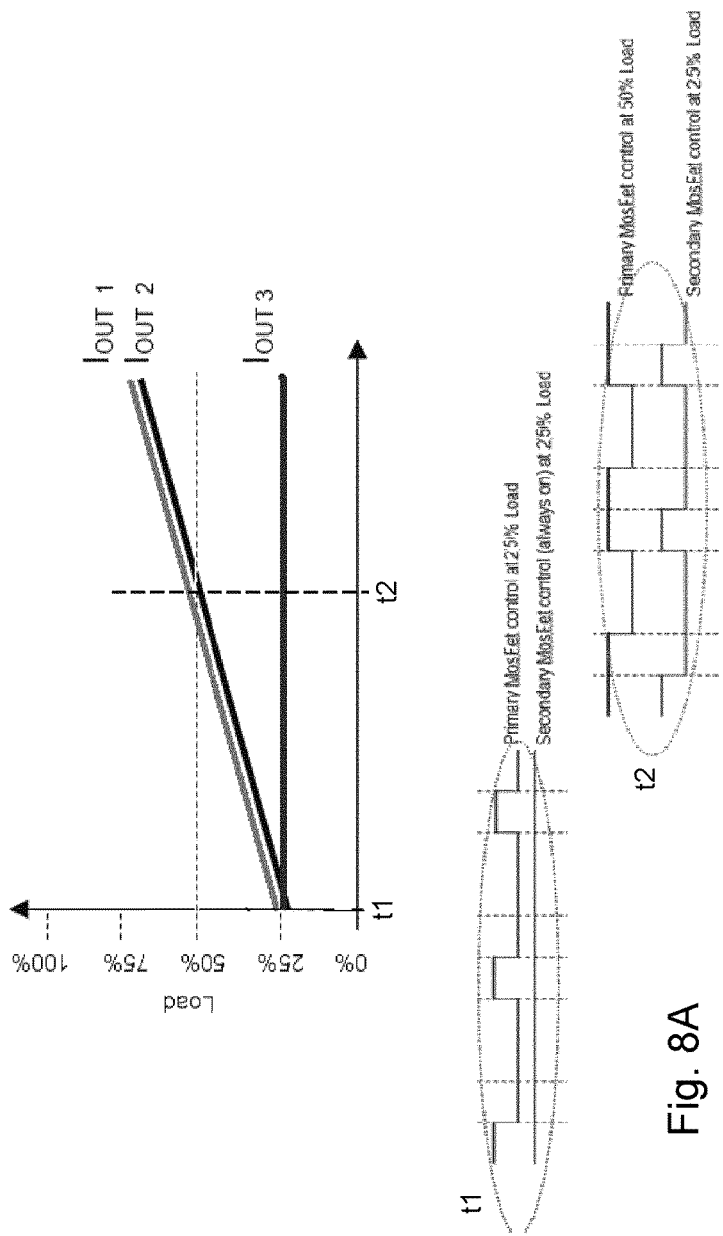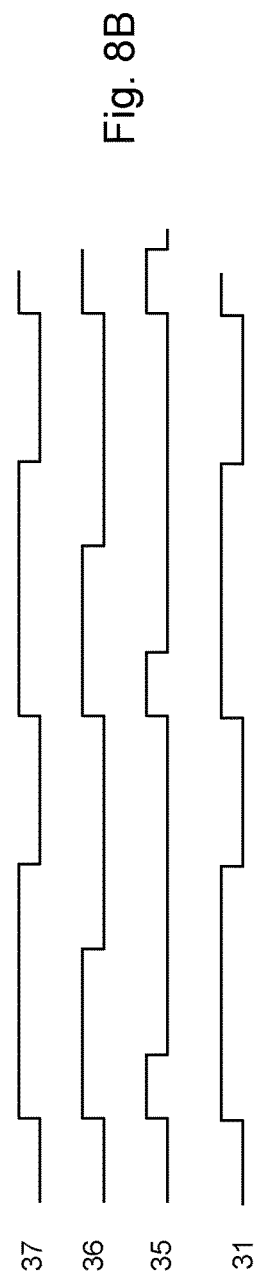
Fig. 8A
Fig. 8B

DC-DC CONVERTER WITH MULTIPLE OUTPUTS

CROSS-REFERENCE TO RELATED APPLICATIONS

This application is a National stage of International Application No. PCT/EP2012/051074, filed Jan. 25, 2012, which claims priority to European Application No. 11192740.6, filed Dec. 9, 2011, which are hereby incorporated by reference.

TECHNICAL FIELD

This invention relates to DC-DC power conversion in applications requiring multiple DC outputs.

BACKGROUND

In some applications there is a need to provide a range of different DC power supply voltages to meet the power supply requirements of different equipment modules. As an example, in the field of communication apparatus, there is typically a 48V DC supply and modules can have power supply requirements selected from the range: 12V, −12V, 1.04V, 1.2V, 1.8V, 2.5V, 3.3V, 5V. Different power supply voltages may be required to meet the differing demands of analog devices, digital devices, semiconductor technologies etc.

The architecture of a power conversion system for telecom applications typically comprises a small number of primary DC-DC converters providing medium voltage levels from the main DC voltage source (typically 48V), and several point-of-load converters (secondary conversion), one for each output voltage, to achieve the lower voltages. Typically, there is a first (isolated) conversion from −48V to an intermediate voltage, such as 12V or 3.3V, and then several points of load which converts this continuous voltage to the needed low voltages (typical example of secondary supply rails: +/−12V @ 2.2 A; +3.3V @ 6 A; +1.8V @ 6 A; +1.2V @ 6 A; +1.04V @ 13 A). FIG. 1 shows an example of a conventional power conversion architecture.

A disadvantage of the existing approach to designing a multiple output DC-DC converter is that it can deliver a poor conversion efficiency, because the converter cascades multiple stages of conversion. For example, with three cascaded conversion stages, each having a conversion efficiency of 0.9, there is an overall conversion efficiency of 0.9*0.9*0.9=0.729. This approach also requires a very large number of components for the multiple conversion stages of the DC-DC converter, and the associated high cost and large physical size of a converter having multiple conversion stages.

SUMMARY

An aspect of the invention provides a multiple output DC-DC converter comprising a transformer having a primary winding and at least one secondary winding. The converter further comprises a primary circuit comprising an input for connecting to a DC power supply source, the primary winding of the transformer and a primary switch connected in series with the primary winding. The converter further comprises a plurality of secondary circuits. Each secondary circuit comprises the secondary winding of the transformer or a respective winding of a plurality of secondary windings of the transformer, and an output stage for providing a DC power supply output. At least one of the secondary circuits comprises a secondary switch. A controller is arranged to monitor a respective output signal of each of the secondary circuits and to control operation of the primary switch and the at least one secondary switch based on the monitored signals. The controller is arranged to co-ordinate operation of the at least one secondary switch with the primary switch, such that the primary switch and the at least one secondary switch are switched on at the same time, or with a controlled offset.

Advantageously, multiple secondary circuits comprise a secondary switch. Each of the secondary circuits can comprise a secondary switch.

A converter according to an embodiment of the invention can provide a higher conversion efficiency, because it avoids the need for multiple conversion stages. This reduces operating cost, and also reduces the number of components, manufacturing cost and physical size of the converter.

The secondary outputs of the converter can be of equal voltage or different voltage. The secondary outputs can be constant, or they can be variable over time.

Outputs of the secondary circuits can be easily set to a desired value with high accuracy and stability. The controller allows control of the converter performance in terms of transient response, stability, efficiency, ripple, and output voltage as well as speediness and smoothness of the voltage adjusting.

The converter can be used to provide supply voltage partitioning, by selectively turning secondary circuits on or off depending on load demands. The converter can also be used to provide supply voltage scaling, by controlling an output of one or more of the secondary circuits based on load demands. This contrasts with conventional power supply units which are designed in order to provide a constant power equal to the maximum traffic load of the given system.

Another aspect of the invention provides a communication apparatus comprising a plurality of modules. Each module has a DC power supply input. The apparatus further comprises a DC-DC converter. Each DC power supply output of the converter is connected to a respective DC power supply input of one of the plurality of modules.

Advantageously, the apparatus further comprises a power management entity which is arranged to determine a load demand of at least one of the modules and to cause the controller to activate the DC power supply outputs based on the determined load.

Advantageously, the apparatus further comprises a power management entity which is arranged to determine a load demand of at least one of the modules and to cause the controller to scale the DC power supply outputs based on the determined load.

A further aspect of the invention provides a method of providing multiple DC outputs at a multiple output DC-DC converter. The converter comprises a transformer having a primary winding and at least one secondary winding. The converter further comprises a primary circuit comprising an input for connecting to a DC power supply source, the primary winding of the transformer, a primary switch connected in series with the primary winding and a plurality of secondary circuits. Each secondary circuit comprises the secondary winding of the transformer or a respective winding of a plurality of secondary windings of the transformer and an output stage for providing a DC power supply output. At least one of the secondary circuits comprises a secondary switch. The method comprises monitoring a respective output signal of each of the secondary circuits. The method further comprises controlling operation of the primary switch and the at least one secondary switch based on the monitored signals. The controlling comprises co-ordinating operation of the at least one secondary switch with the primary switch, such that the primary switch and the at least one secondary switch are switched on at the same time, or with a controlled offset.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIGS. 5A and 5B show secondary circuits in more detail;

FIGS. 8A and 8B show operation of the primary and secondary switches;

DETAILED DESCRIPTION

Figure 1:
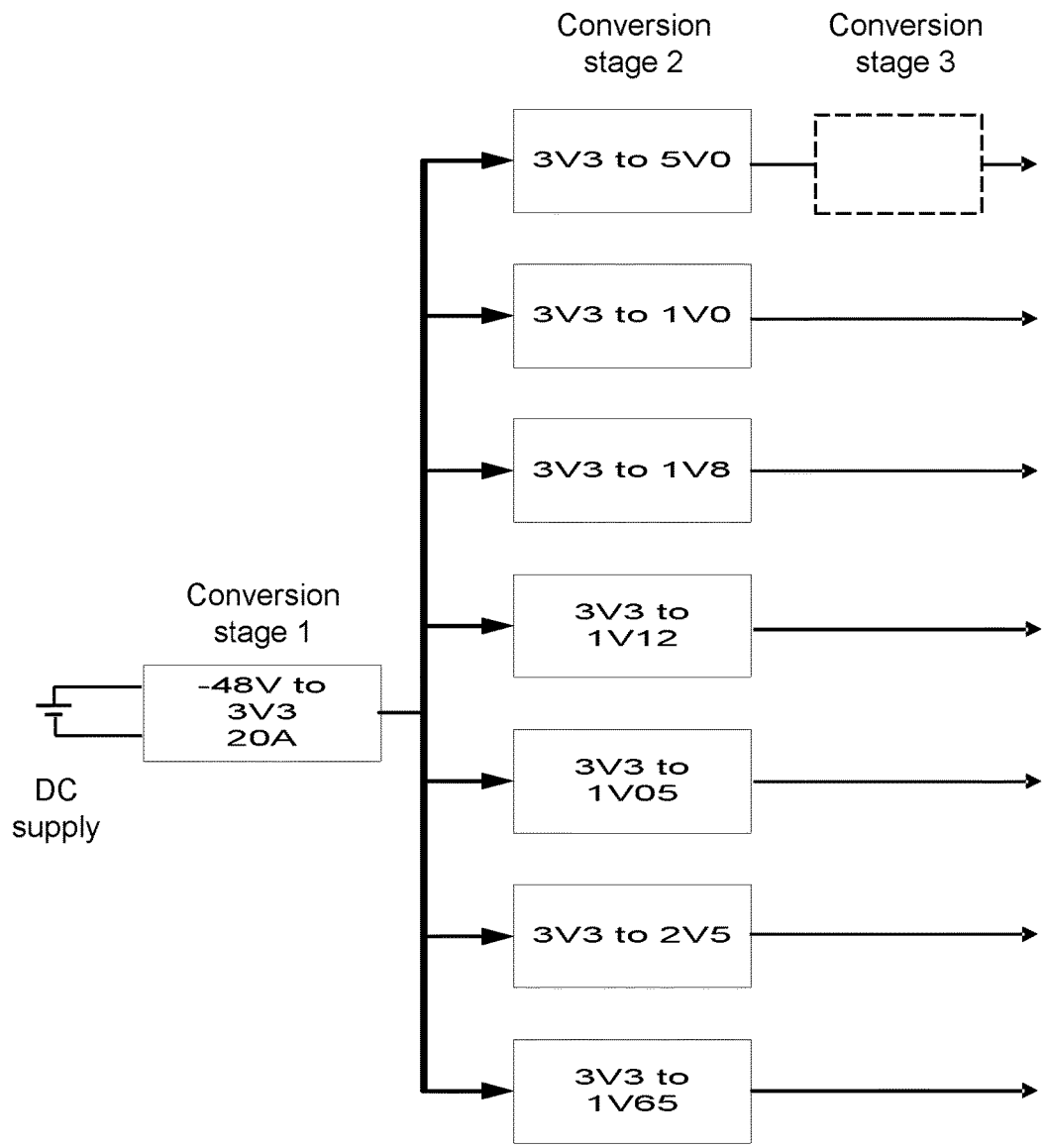
FIG. 1 shows a prior art DC-DC converter architecture.
Figure 2:
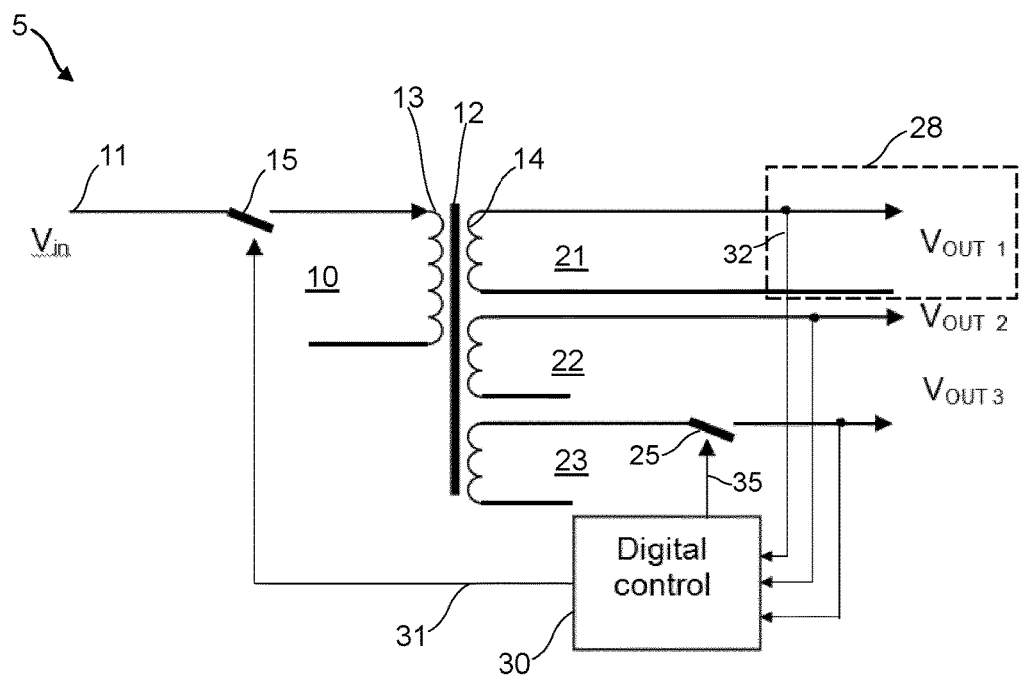
FIG. 2 shows a DC-DC converter according to an embodiment of the invention with secondary switching in one of the secondary circuits.
Figure 3:
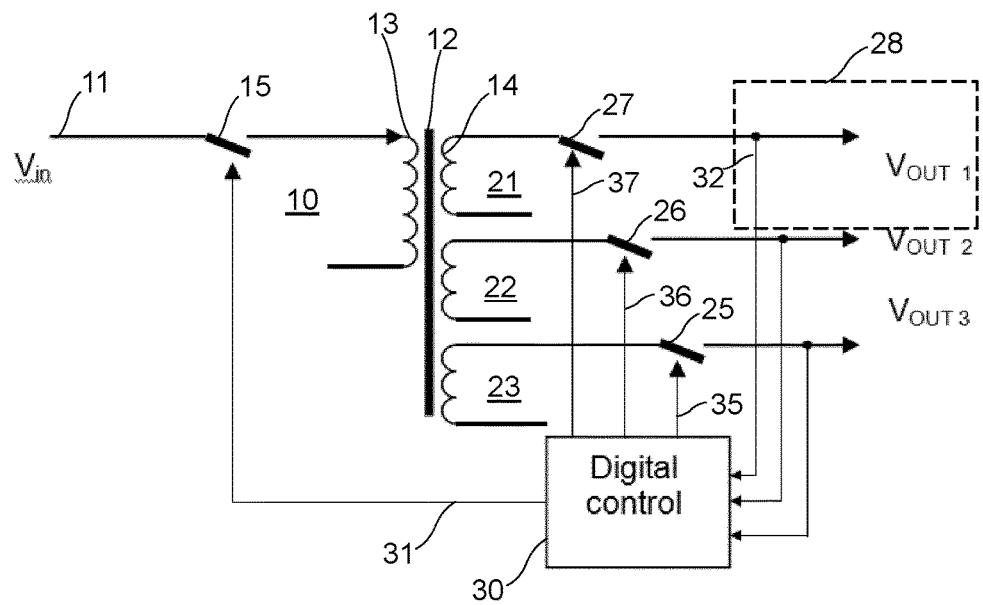
FIG. 3 shows a DC-DC converter according to an embodiment of the invention with secondary switching in each of the secondary circuits.
Figure 4:
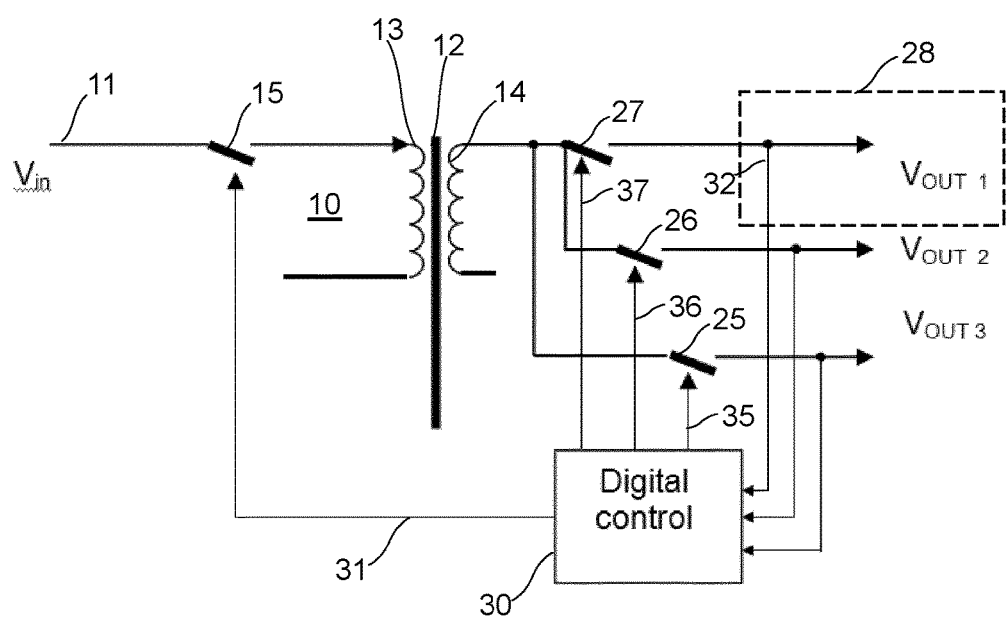
FIG. 4 a DC-DC converter according to an embodiment of the invention with a single secondary winding common to the secondary circuits.

FIGS. 2 to 4 show DC-DC power converter architectures according to embodiments of the invention. In each of the architectures, there is a transformer 12 having a primary winding 13 and at least one secondary winding 14. In FIGS. 2 and 3, there are multiple secondary windings 14, with each secondary winding 14 dedicated to a different secondary circuit 21, 22, 23. In FIG. 4 there is a single secondary winding 14. Each secondary circuit comprises the secondary winding 14, an output stage 28, and a secondary switch 25, 26, 27. Each secondary circuit can provide a power supply to a module of a communication apparatus, or part of a module of a communication apparatus, or can provide a power supply rail used by a module of a communication apparatus. In each of the architectures, there is a primary circuit 10 comprising: an input 11 for connecting to a DC power supply source ($V_{in}$); the primary winding 13 of the transformer; and a primary switch 15 connected in series with the primary winding 13. The primary switch 15 can be a semiconductor power switch such as a Metal-Oxide Semiconductor Field-Effect Transistor (MOSFET), a bipolar transistor, an Insulated-Gate Bipolar Transistor (IGBT) or any other switch capable of switching the input supply. Three secondary circuits are shown in FIGS. 2 to 4 as an example. More generally, the number of secondary circuits can be any number greater than, or equal to, two.

Each secondary circuit 21, 22, 23 comprises one of the plurality of secondary windings 14 of the transformer (FIGS. 2, 3) or the single secondary winding of the transformer (FIG. 4). An output stage 28 provides a DC power supply output. The output stage 28 is shown in more detail in FIGS. 5A and 5B, and comprises an LC low-pass filter having an inductor in series with the output and a capacitor in parallel with the output to provide a smoothed DC output signal.

At least one of the secondary circuits 21, 22, 23 comprises a secondary switch 25, 26, 27. The secondary switch is arranged in series with the secondary winding. In FIG. 2, only one of the secondary circuits 23 has a secondary switch 25. In FIG. 3, each of the secondary circuits 21, 22, 23 has a secondary switch 25, 26, 27.

A controller 30 is arranged to monitor a respective output signal 32 of each of the secondary circuits 21, 22, 23 and to control operation of the primary switch 15 and the at least one secondary switch 25, 26, 27 based on the monitored signals. The monitored signal 32 can be an output voltage of the secondary circuit (e.g. see FIG. 5A) or an output current of the secondary circuit. Current is measured by placing a small resistance in series with the output. The primary switch 15 and the secondary switch (or switches) 25, 26, 27 are opened and closed at a very high rate, typically of the order of 100 s of KHz, e.g. around 400 KHz. The controller 30 is arranged to co-ordinate operation of the secondary switch (or switches) 25, 26, 27 with the primary switch 15, such that the primary switch 15 and the at least one secondary switch 25, 26, 27 are switched on at the same time, or with a controlled offset. Typically, the primary switch 15 will be switched on first, and then the secondary switches 25, 26, 27 will be switched on after a short delay. The delay can be configured per secondary switch 25, 26, 27. Controller 30 outputs a pulse width modulated (PWM) control signal 31 for the primary switch 15 and a PWM control signal 35 for the secondary switch 25.

Referring again to FIGS. 2 to 4, all of the required output secondary voltages are directly provided by the single conversion stage, which is a type of forward converter. The digital controller 30 samples the outputs of the secondaries 21, 22, 23 and evaluates a PWM signal controlling the gate of the primary switch 15 and secondary switch (or switches) 25, 26, 27. In use, the secondary circuits 21-23 may experience substantially uniform loads (or changes in loads), or they may experience non-uniform loads (or changes in loads). The load represents a current drawn from the secondary circuit by apparatus connected to the output of the secondary. The term "uniform" means the load, or change in load, for each of the secondary circuits is equal, or within a small value of one another. Providing a secondary switch 25, 26, 27 in a secondary circuit 21, 22, 23 allows that secondary circuit to cope with a load (or a change in load) in situations where the load (or change in load) is different to that of another secondary circuit. The secondary switch 25, 26, 27 can be called a post-regulation switching element. The transformer 12 provides isolation of the power outputs from the main supply (Vin, e.g. in the range 30-60V). The DC power supply is squared by the primary switch and so the signal can pass through the transformer in order to be used by the secondary for further handling. FIGS. 2 to 4 show a single primary switch. Other switching architectures can be used, such as two switches in parallel to halve MOSFET Rd_on (serial resistance during the on cycle) for reduced losses. The primary circuit can also comprise other components, such as resistors, an inductor, a diode and capacitors for de-magnetising the primary transformer turns.

The secondary switches in each of the secondary circuits are synchronised with the primary switch, and are able to connect the LC filter to the supply during the "on" period and to hold the energy during the "off" period.

FIGS. 5A and 5B show one of the secondary circuits 21, 22, 23 in more detail. Switch 25 is the secondary switch that can, in use, shorten the waveform transferred through the transformer from the primary. A further secondary switch 25A can also be provided. The operation of switch 25A is coordinated to the operation of switch 25; switch 25A is closed when switch 25 is open, so as to discharge the energy stored into the inductor in order to avoid saturation. The serial diode 24 is provided to allow discharge of energy from parasitic components of the switch 25 when switch 25 is opened. FIG. 5B operates in the same manner as FIG. 5A, but it generates negative voltages.

One strategy for controlling the primary and secondary switches will now be described. Under conditions where there is a uniform change in load between the secondary circuits 21, 22, 23, the controller 30 can adjust power transferred from the primary circuit 10 to the secondary circuits 21, 22, 23 by only controlling the primary switch 15. Under conditions where there is a non-uniform change in load, a further "fine-tuning" of a secondary circuit can be achieved by the secondary switch 25, 26, 27 in that secondary circuit, such that the combined (synchronous and coordinated) action of both switching elements 15, 25 provides an on-off duty cycle matched to the load demands of that secondary circuit. The secondary switch 25, 26, 27 can have a shorter duty cycle than the primary switch 15 if the output voltage of a secondary circuit is lower than the voltage determined by the primary switch 15. Each secondary circuit 21, 22, 23 can have a different duty cycle, based on the load of that secondary circuit. FIG. 8A shows an example of load (output current) for three secondary circuits over a period of time. $I_{OUT1}$, $I_{OUT2}$, $I_{OUT3}$ respectively represent the current drawn from secondary circuits 21, 22, 23. $I_{OUT1}$ and $I_{OUT2}$ increase over time, and the load is uniform for both secondaries. $I_{OUT3}$ remains constant over the same period, and is non-uniform with respect to $I_{OUT1}$ and $T_{OUT2}$ after the initial time t1. At a first point in time, t1, the loads of all three secondaries are uniform, and 25%. The primary switch 15 is set at 25% duty cycle, as this meets the demand of the secondary having the highest load demand. At a later point in time, t2, the loads of two secondaries have changed. $I_{OUT1}$ and $I_{OUT2}$ have risen to 50% load, and are uniform with each other. $I_{OUT3}$ has remained at 25%. The primary switch 15 is set at 50% duty cycle, as this meets the demand of the secondaries having the highest load demand. The duty cycle of secondary 23 ($I_{OUT3}$) is reduced to 50% of the primary duty cycle. It should be understood that percentages are used just as an example to aid understanding, and duty-cycle variation may not be linear with the load variation.

FIG. 8B shows a set of PWM control signals 35, 36, 37 for the secondary switches in three secondary circuits 21, 22, 23, and a PWM control signal 31 for the primary switch in the primary circuit. In this example, the duty cycles of the three secondary circuits are different. It can be seen that the primary switch is operated with a duty cycle based on the most demanding secondary circuit which, in this example, is PWM signal 37.

Under a condition when an output of a secondary circuit requires the secondary switch of that secondary circuit to have the same duty cycle as a primary circuit (e.g. see time t1 in FIG. 8A), the secondary switch can either be: (i) turned on continuously (as shown in FIG. 8A), or (ii) turned on and off in synchronism with the primary switch, subject to an offset at the beginning and/or end of the "on" period. This condition can arise when the the secondary circuit has the highest demanding output.

Figure 6:
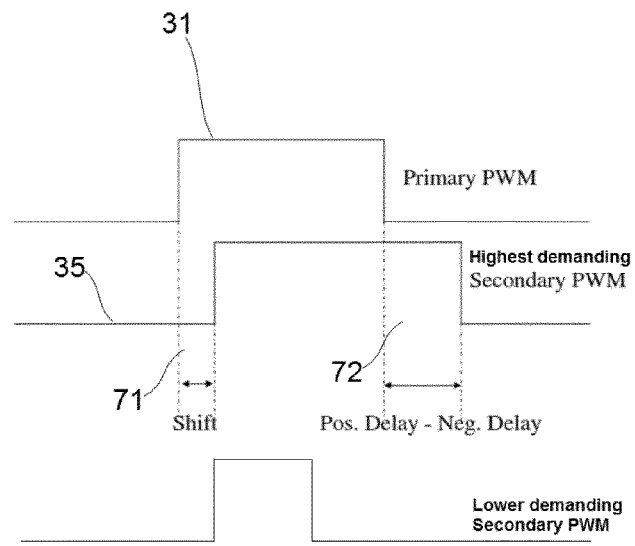
FIGS. 6 and 7 show timing of the primary and secondary switches.
Figure 7:
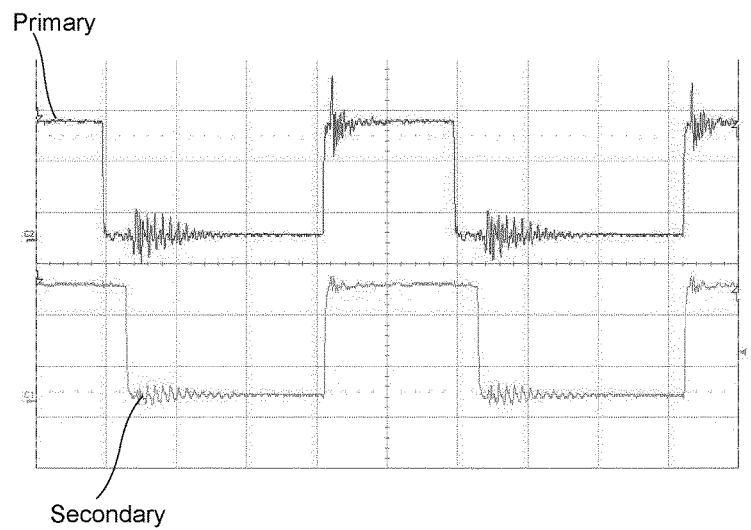

FIGS. 6 and 7 show the primary and secondary switching in more detail. Typically, there will be a delay 71 between the leading edge of the primary switch control signal 31 and the leading edge of the secondary switch control signal 35. The secondary switch control signal can return to zero before, or after, the primary switch control signal, depending on load demands of the secondary. Under conditions where the secondary has the highest load among the set of secondaries, the primary switch will be set to match the load demand of that secondary. Therefore, the control signal 35 for that secondary will return to zero with the control signal 31 for the primary switch, or shortly after it (allowing energy to transfer through the transformer). Under conditions where the secondary has a lower load demand than other secondaries, the primary switch will be set to match the load demand of another secondary having a higher load. Therefore, the control signal 35 for that secondary will return to zero before the control signal 31 for the primary switch. The quantity 72 is a fine tuning for optimizing the energy transfer and to recover the MOSFET switching dead-time.

The number of turns in the primary winding 13 and the number of turns in the secondary winding 14 determines a turns ratio. If the turns ratio=1, then the secondary voltage equals the primary voltage. If the turns ratio ≠1, a voltage scaling occurs, with the secondary voltage scaling in the same manner as the turns ratio. For example, a turns ratio of 1:2 (i.e. secondary winding has twice the number of turns as the primary winding) gives a voltage scaling of 1:2, i.e. the secondary has twice the voltage of the primary. The turns ratio for each secondary can be set independently of the turns ratio for other secondaries. A desired output voltage can be achieved by a combination of setting a turns ratio and controlling the secondary switch 25, 26, 27. Typically, the turns ratio will be fixed at the time of manufacture but it is also possible to configure this during operation, such as providing a transformer winding with multiple tap points that can be selected according to which turns ratio is required.

The rectified (DC) secondary outputs can be of equal voltage or different voltage. The secondary outputs can be constant, or they can be variable over time. The converter offers considerable flexibility.

Figure 9:
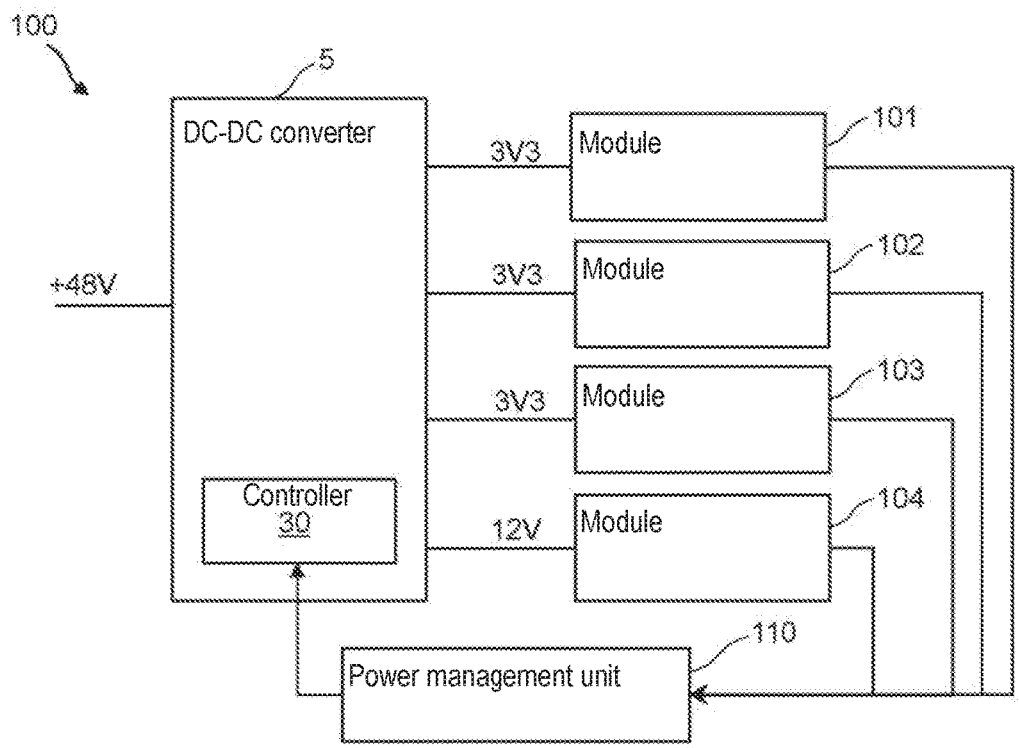
FIGS. 9-11 show communication apparatus powered by the DC-DC converter.
Figure 10:
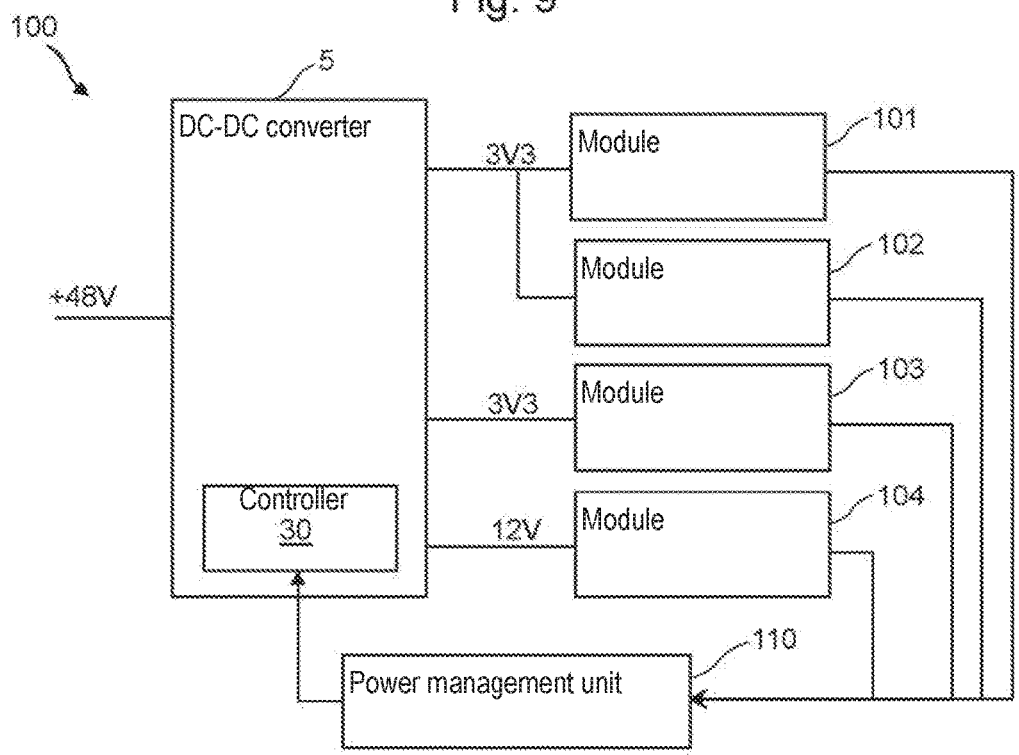
Figure 11:
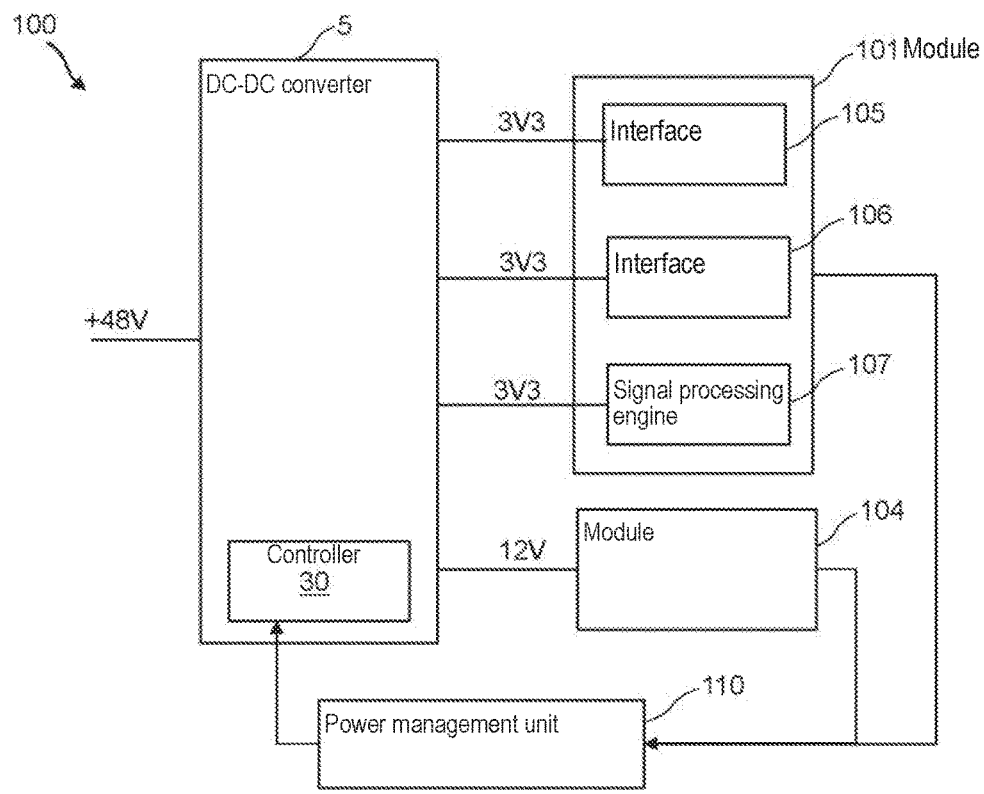

FIG. 9 shows communication apparatus 100 comprising a plurality of modules 101-104. Each module has a DC power supply input. The communication apparatus can, for example, be a communications switch, router, or a wireless base station. A DC-DC converter 5 provides a DC power supply output to a respective DC power supply input of each of the plurality of modules 101-104. In FIG. 9 there is one power supply output from the converter 5 per module 101-104. A power supply output from the converter 5 can be provided to multiple modules, as illustrated by the arrangement of FIG. 10, where the 3.3V output of the converter is provided to modules 101 and 102. Multiple power supply outputs from the converter 5 can be provided to a single module, as illustrated by the arrangement of FIG. 11, where three 3.3 V outputs of the converter 5 are provided to module 101.

One advantage of this approach is that it facilitates supply voltage partitioning. Voltage partitioning allows creation of multiple "supply islands" or "domains". Consider that module 101 in FIG. 11 represents a communication module comprising two interfaces 105, 106 and a signal processing engine 107. Instead of having a single (e.g. 3V) supply rail for the entire module 101, the power supply for the module is partitioned into three domains, i.e. three separate 3V supply rails. This makes it possible to switch off the power supply feeding one interface (e.g. interface 105) when that interface is unused. An output of a secondary circuit is switched off by continuously turning off the secondary switch 25 in that secondary circuit. The same principle can be applied to entire modules, with the power supply being activated based on whether a module is active or inactive. A power management unit 110 receives an input from each module 101, 104 indicating a load demand of that module (or part of the module). The load demand can be an indication of whether the module (or part of the module) is active or inactive. The power management entity 110 outputs a control signal to the controller 30 of the power converter 5 to activate or inactivate particular power supply outputs of the converter 5 based on the determined load demand.

A further advantage is that it is possible to implement voltage scaling. It is possible to reduce the supply voltage to one module (e.g. the signal processing engine 107 in FIG. 11) when that element is no longer required to operate at maximum processing speed. The supply voltage can be scaled by varying the duty cycle of the primary and/or the secondary switches 15, 25, 26, 27. The power management unit 110 receives an input from each module 101, 104 indicating the load demand of the module (or part of the module). The power management entity 110 outputs a control signal to the controller 30 of the power converter 5 to scale particular power supply outputs of the converter 5 based on the load demand. This approach provides an important energy saving when traffic load is low, such as during the night, at weekends, etc. while still providing the ability to promptly provide maximum load capacity, during periods when the full capabilities of the module are required by resuming provision of the three 3V supply voltage rails.

The converters described above can provide a stable output voltage with a small number of components required in the converter. The power conversion efficiency is significantly improved over a converter having a cascade of converter stages.

Although a communication apparatus 100 has been shown in FIGS. 9 to 11, the apparatus can have a different function, other than for use in a communication network.

Figure 12:
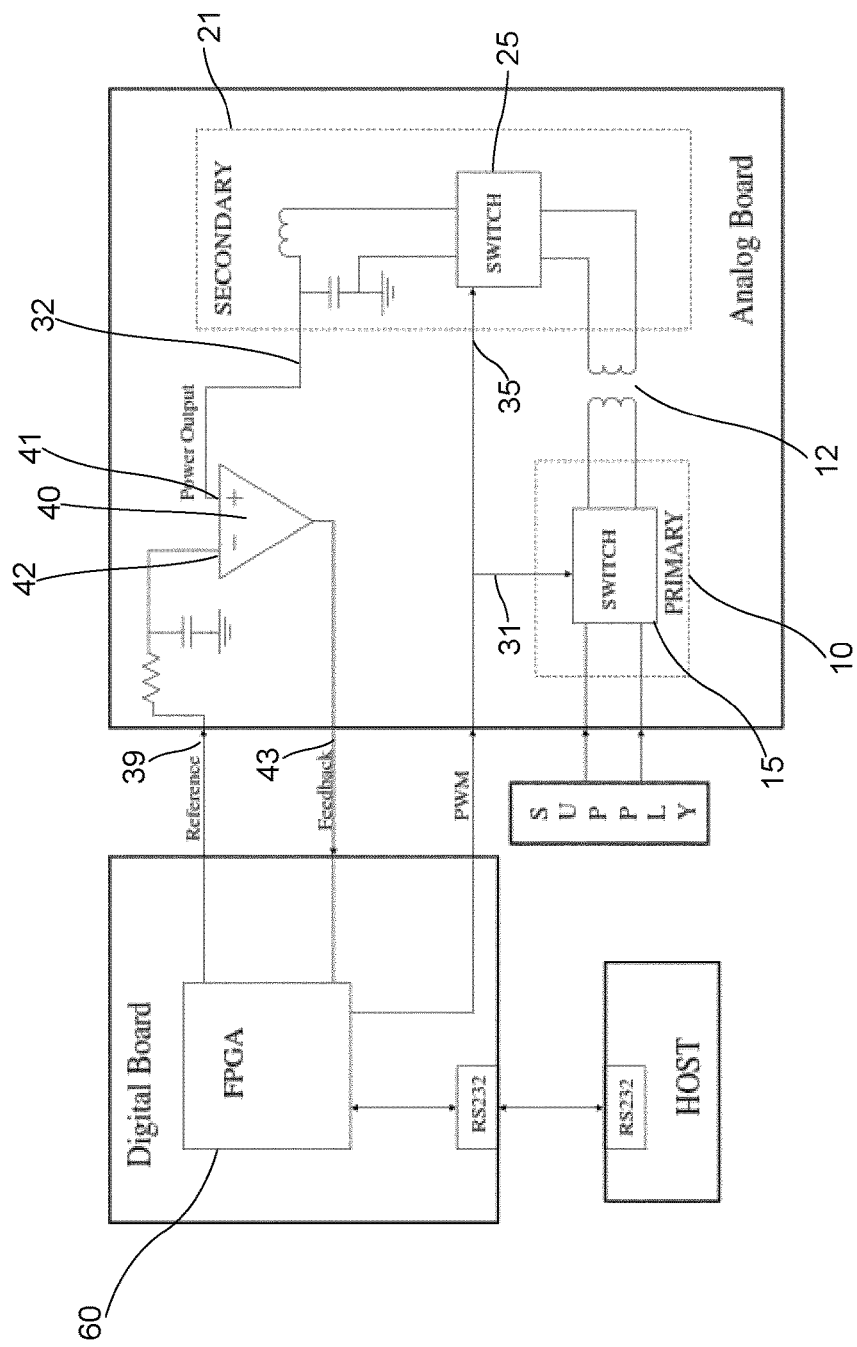
FIG. 12 shows a controller for the converter.
Figure 13:
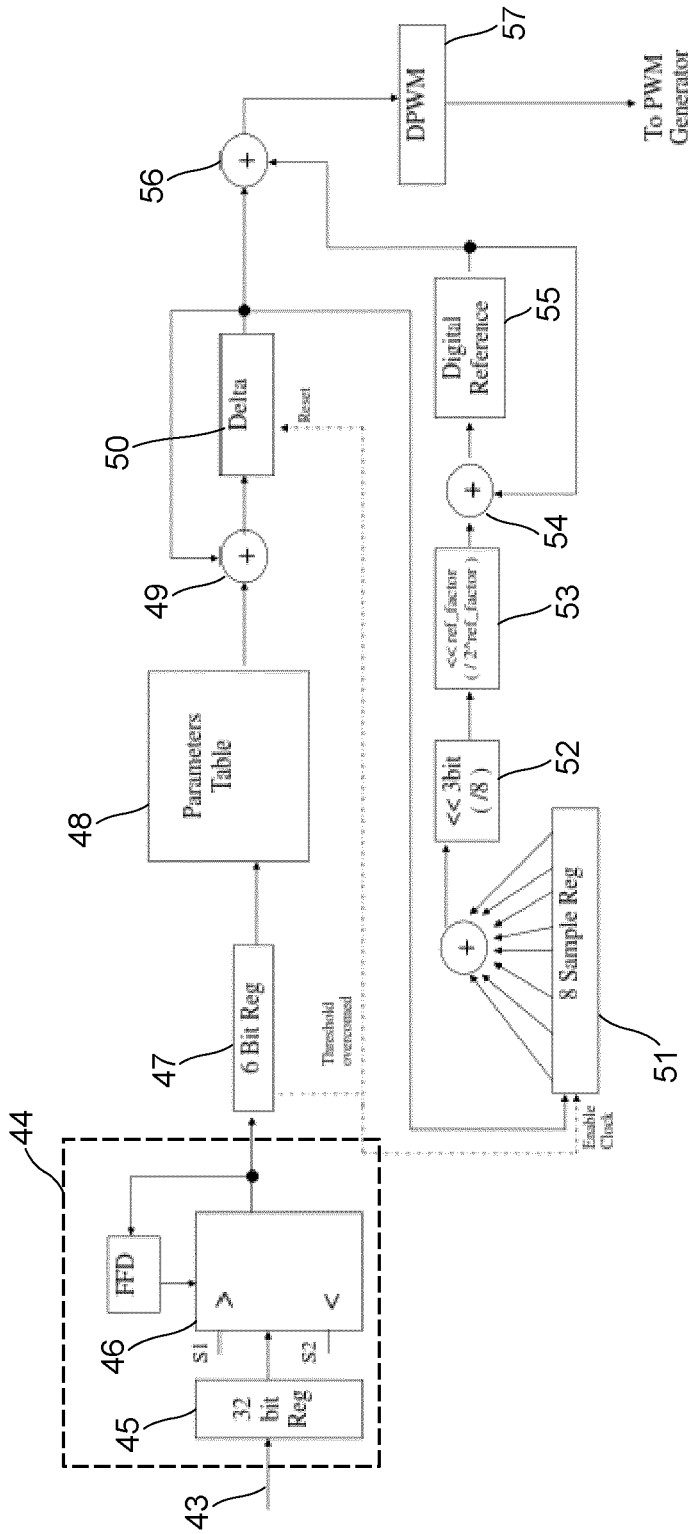
FIGS. 13 and 14 show detail of the controller.
Figure 14:
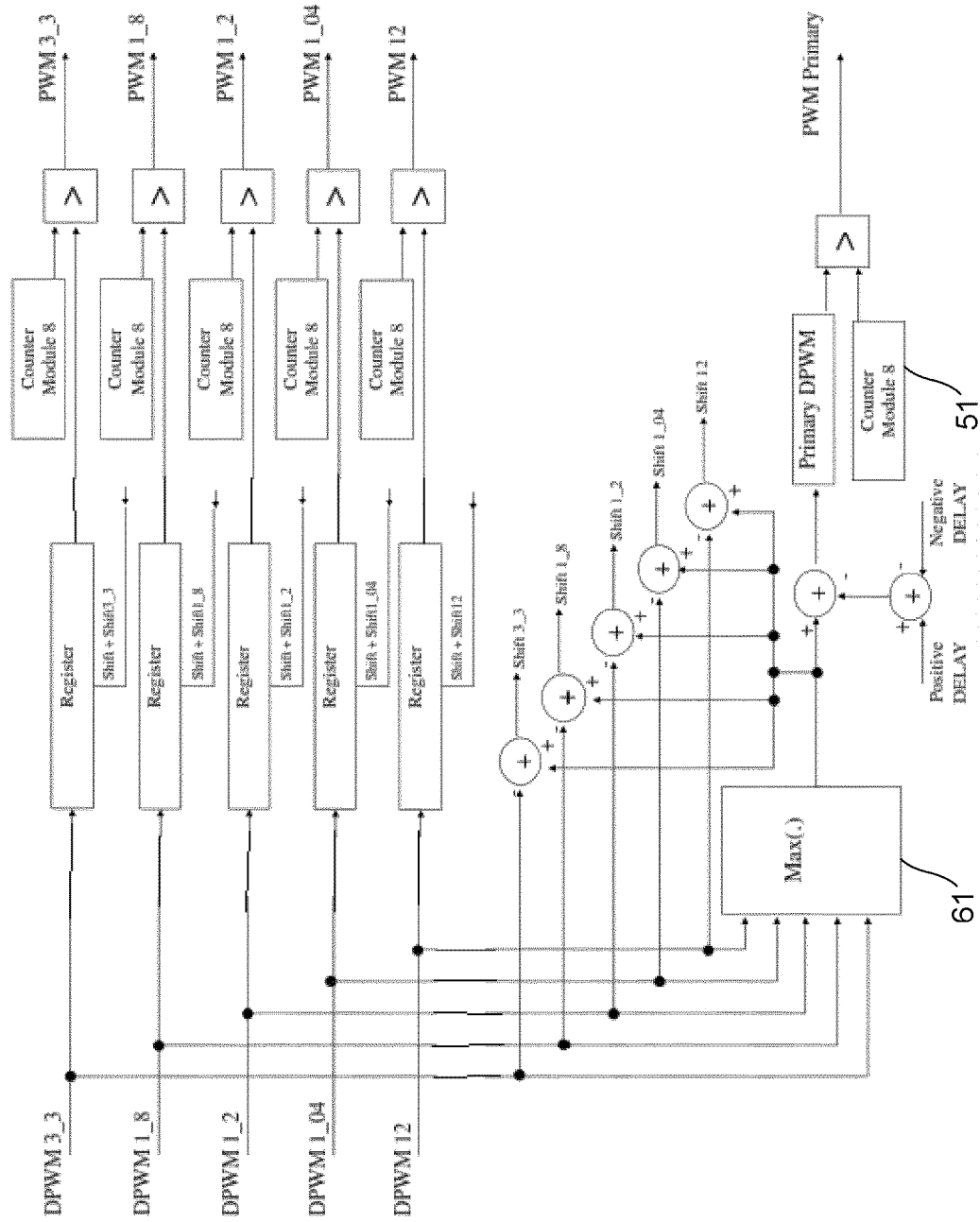

FIGS. 12 to 14 show an embodiment of a controller for the converter. The controller comprises control logic 60, a feedback path 32, 40-43 from the output stage 28 of each secondary 21 to the control logic 60, and PWM control outputs 31, 35 to the primary switch 15 and the secondary switches 25, 26, 27.

In an advantageous controller, just one bit of feedback data 43 is provided for each monitoring period. Rather than sampling and coding an output signal of the secondary using an analog-to-digital converter, a comparator 40 is used. An output signal 32 from a secondary circuit is applied to one input of the comparator 40. A reference signal 39 is applied to another input of the comparator 40. The comparator is arranged to compare the output signal 32 with the reference signal 39 and to output a (1-bit) comparison result 43. The comparison result 43 is forwarded to digital logic 60. Logic 60 can be implemented using a Field Programmable Gate Array (FPGA), logic array, general purpose processor, or any other kind of processing apparatus.

As the control is based on just one bit of feedback data, the feedback itself only indicates if the output is over or under a reference signal, but not the error entity, as is usually available with a conventional digital Proportional-Integral-Derivative (PID) controller. The controller receives an input from one comparator 40 per secondary circuit 21, 22, 23. The controller can use analog reference thresholds provided by the Digital Control (e.g. Sigma-Delta DACs or any other kind of DAC apparatus).

The controller comprises the following blocks for each output voltage:

Digital filter 44: the input 43 (feedback coming from the 1-bit comparator) is sampled n times (e.g. 32 bits) in a PWM period (e.g. PWM frequency=390 KHz) and a counter 46 is incremented every time the sample is a logic 1; if the number of 1 is much higher than the number of 0 the input is considered a logic 1, and vice versa. If the number of zeros is similar to the number of ones, the input is considered to be in a "noise state" which means the power output is really near to the analog reference 39 (threshold) and so the filter 44 provides an input to the controller in order to maintain the current PWM duty cycle. S1 and S2 are the thresholds for the input decision. The digital filter 44 acts as a low pass filter on the input signal from the comparator 40.

K bit register (e.g. 6 bits) 47: the input from the filter is stored into one per each output voltage 6 bit SIPO (Serial Input Parallel Output) register, in order to have the timing information (trend) of the input signal. This is because a single bit of input cannot inform about the distance of the output voltage from the given threshold reference, and so the control considers from how long the signal has been under/over the threshold for deciding which type of action is needed.

The digital filter 44 and K bit register 47 avoid the use of a complex and costly ADC to sample the output voltage of a secondary circuit.

Parameters Table 48: depending on the K (e.g. 6) samples of the input, a parameter is selected as an incremental step for the register Delta. Having K (e.g. 6) bits of input, the Parameters Table has $2^K$ ($2^6=64$) parameters defined; indeed parameters are $2^{(K-1)}$, e.g. 32, with opposite signs, i.e. the control imposes symmetrical actions according to the fact the feedback signal is over or under the threshold.

Delta: it is the total increment/decrement to be added to the Digital Reference. In order to eliminate the inertia of an incremental control, the Delta register is reset every time the input passes the threshold (i.e. each time the input sample change from 0 to 1 or vice versa).

M Samples Register (e.g. M=8) 51: it contains M (e.g. 8) different values of Delta register that are stored every time the input changes its value. It is used in order to evaluate the Digital Reference.

Digital Reference 55: it can be seen as the digital form of the desired PWM (duty cycle to obtain the output equal to the analog reference). It is obtained by the sum of the previous Digital Reference value and the average of M (e.g. 8) values of the Delta register (Delta Average). The Delta Average can also be divided by another parameter n, the Reference_Factor, so allowing to different convergence velocity, i.e. time needed by the Digital Reference to match the desired duty cycle. The formula is shown hereafter, where n is the reference factor.

$$Vref = Vref + \frac{delta + delta_1 + delta_2 + delta_3 + delta_4 + delta_5 + delta_6 + delta_7}{8*n}$$

As soon as converged, the Digital Reference will match the desired duty-cycle, but still need to be summed to the "actual" Delta (representing the actual variations around the threshold) in order to allow the promptest loop reaction for compensating any variation. The digital reference will match the reference 42 when the output has reached the desired voltage.

DPWM (for Secondary switches) 57: is the Digital Reference plus the "actual" Delta and it represents in digital form the effective duty-cycle to be applied to the switching element (the MOSFET). The DPWM is the number of bits (e.g. at 100 MHz) that have to be at high value (logic 1) for defining the PWM duty-cycle; the minimum granularity is $\frac{1}{256}$ although the proposed algorithm is generic enough to be applied with different granularity levels.

PWM for Secondary switches: once each DPWM is calculated, it is compared with a counter module 8 that counts from 0 to 255 (max DPWM is 255) in order to generate a square wave at 390 KHz with duty-cycle according to DPWM, i.e. the effective PWM signal that will control the secondary switch 25, 26, 27. The specific values for square wave frequency and counter module can be varied from the examples given here.

DPWM for Primary switch: it is implemented by a direct comparison of all the Secondary DPWM waves. In this embodiment, comparison is a "smart" logic OR of all the secondary DPWM, performed by the Block Max(.), but the basic architecture is intrinsically open to other control algorithms, where for instance the secondary switch of the highest demanding output can be always on, i.e. larger then the primary switch, as such other logic functions may apply instead of the logic OR.

Block Max(.) 61: it detects the maximum DPWM value of the secondary circuits, i.e. the DPWM with the largest "MOSFET close" cycle (OR logic of all the Secondary DPWM).

As previously explained, each secondary uses a modulation of the input DC voltage for the direct generation of the output voltages, and this is achieved through a transformer 12 to guarantee isolation and eventually to arrange for a given voltage by means of the transformer's turn ratio. The transformer 12 is inductive and so it is current inertial. When all of the secondary stages are opened, the energy that is stored into the transformer inductance cannot find a way to ground without generating problems to the system functioning such as overshoots and, besides this, the conversion process loses this energy. The control algorithm has been fine-tuned in order to be able to use also this energy by setting the optimal phase displacement between the Primary PWM and the Secondary PWMs. This is achieved by opening the Primary switch before the Secondary switches, so that the energy stored into the transformer can usefully flow toward the load. If the delta phase between Primary and Secondary PWM waves is too high, the current will change its direction by asking energy to the load. If the delta phase is too low, the full recovery of the energy stored in the transformer will fail. Several shift registers are used to store delay values:

Shift register DPWM: shift registers in order to set the optimal phase between the Secondary PWMs and the Primary PWM, one per each output voltage control; their role is to store the Secondary DPWM signals and to get available the signal at the output after "Shift+Shift_3_3" clock cycles (3_3 in case of line 3.3V). Shift is a programmable delay parameter which is common for all the output voltages.

Shift (3_3; 1_8; etc.): Shift_3_3 (in case of line 3.3V), etc. is a delay time proper for each output voltage. This feature may not always strictly needed, but can be useful in situations with different secondary switches, e.g. a high current (and expensive) MOSFET for a high current output, and a low current MOSFET for a low current output, with (slightly) different on-off timing.

Positive and Negative Delay: used in order to fine-tune the Primary DPWM word duty-cycle to be slightly longer or shorter than the pure OR-logic of the Secondary DPWM.

The control algorithm has $2^{(K-1)}$, e.g. 32, symmetric parameters that correspond to incremental steps of the delta register, function of input samples trend. In fact, the decision of the parameter to be used depends on K (e.g. 6) successive samples of the 1-bit input (feedback from comparators), so there are $2^K$ (e.g. 64) combinations that can be considered symmetric (so 32 parameters). Three classes of parameters can be individuated looking to the number of signal edges into the input buffer:

F (Force): the output signal is far from the threshold for a long time (e.g. 000000, 001111), the action must be strong DF (Damping Factor): the output has just reached the threshold, but the inertia continues to force the signal in the same direction, so the action has to be strong in the opposite direction M (Maintenance): the output is near the threshold, so the action has to be soft Table 1 represents, as example not limiting the flexibility of the invented technique, the relationship between the 32 inputs from the buffer and the three classes above mentioned (the sign, i.e. the step direction is not shown). The numbers next to the parameter's name (e.g. F1) indicate the strength of the action, e.g. 1=strong.

For better understand the mechanism and the association of the parameters, hereafter is reported an example:

Initial condition (at power on): input buffer 000000

Input 0: buffer 000000→strong action in order to force the signal towards the reference (F, Force=strong action, F1 is the strongest of the F action).

After a while desired voltage is reached, but due to inertial behavior of analog parts, threshold is exceeded Input 1: buffer 000001→threshold exceeded, strong but limited in time action in the opposite direction in order to limit the overshoot (DF, Damping Factor 1 means the strongest of the DF actions)

Input 1: buffer 000011→the signal is still over the reference, continue with a light DF 2

Input 0: buffer 000110→the signal has passed the reference after only two PWM periods, so the signal should be almost stable around the reference; the action has to maintain the current PWM duty cycle because it could be the optimal one, hence parameter is M2 i.e. Maintenance Input 1: buffer 001101→another frequent threshold crossing, so we are very well matching the given threshold, stay there in M3 etc., etc. . . . . .

Please note that, in this example implementation the correlation between Parameters and Value is:

| | | |
|---|---|---|
| F1 = 8 | DF1 = 6 | M1 = 4 |
| F2 = 7 | DF2 = 3 | M2 = 3 |
| F3 = 6 | DF3 = 2 | M3 = 2 |
| F4 = 5 | DF4 = 1 | M4 = 1 | where Value is the incremental step imposed to 49 (8=highest step, 1=minimum step).

Figure 15:
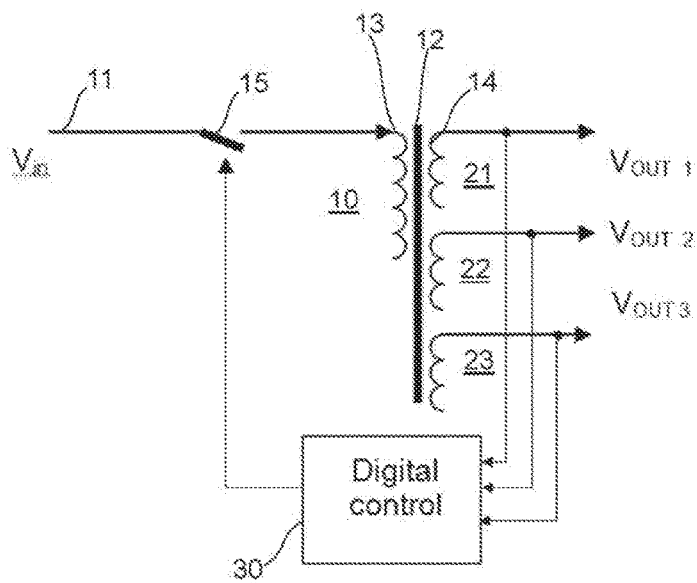
FIG. 15 shows a DC-DC converter without secondary switching.

A further architecture of a multiple output DC-DC converter is shown in FIG. 15. This is similar to the architectures described in FIGS. 2 to 4. However, there are no secondary switches. The controller 30 only controls operation of the primary switch 15, and there is no secondary regulation. The output voltages of the secondary circuits 21, 22, 23 can be regulated if the load current demands on the secondary circuits 21, 22, 23 vary substantially uniformly among the three outputs. This aspect provides a multiple output DC-DC converter comprising a transformer having a primary winding and at least one secondary winding. The converter further comprises a primary circuit comprising an input for connecting to a DC power supply source, the primary winding of the transformer and a primary switch connected in series with the primary winding. The converter further comprises a plurality of secondary circuits. Each secondary circuit comprises the secondary winding of the transformer or a respective winding of a plurality of secondary windings of the transformer, and an output stage for providing a DC power supply output. A controller is arranged to monitor a respective output signal of each of the secondary circuits and to control operation of the primary switch based on the monitored signals. Advantageously, any of the output signals can form the main output of the converter.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

APPENDIX

TABLE 1

F, DF and M parameters

| Input Buffer | | | | | | Parameter | Value |
|---|---|---|---|---|---|---|---|
| 0 | 0 | 0 | 0 | 0 | 0 | F1 | 8 |
| 0 | 0 | 0 | 0 | 0 | 1 | DF1 | 6 |
| 0 | 0 | 0 | 0 | 1 | 0 | M1 | 4 |
| 0 | 0 | 0 | 0 | 1 | 1 | DF2 | 3 |
| 0 | 0 | 0 | 1 | 0 | 0 | F4 | 5 |
| 0 | 0 | 0 | 1 | 0 | 1 | M4 | 1 |
| 0 | 0 | 0 | 1 | 1 | 0 | M2 | 3 |
| 0 | 0 | 0 | 1 | 1 | 1 | F3 | 6 |
| 0 | 0 | 1 | 0 | 0 | 0 | F3 | 6 |
| 0 | 0 | 1 | 0 | 0 | 1 | M3 | 2 |
| 0 | 0 | 1 | 0 | 1 | 0 | M4 | 1 |
| 0 | 0 | 1 | 0 | 1 | 1 | M3 | 2 |
| 0 | 0 | 1 | 1 | 0 | 0 | DF3 | 2 |
| 0 | 0 | 1 | 1 | 0 | 1 | M3 | 2 |
| 0 | 0 | 1 | 1 | 1 | 0 | DF3 | 2 |

TABLE 1-continued

F, DF and M parameters

| Input Buffer | | | | | | Parameter | Value |
|---|---|---|---|---|---|---|---|
| 0 | 0 | 1 | 1 | 1 | 1 | F2 | 7 |
| 0 | 1 | 0 | 0 | 0 | 0 | F2 | 7 |
| 0 | 1 | 0 | 0 | 0 | 1 | DF4 | 1 |
| 0 | 1 | 0 | 0 | 1 | 0 | M3 | 2 |
| 0 | 1 | 0 | 0 | 1 | 1 | M2 | 3 |
| 0 | 1 | 0 | 1 | 0 | 0 | M2 | 3 |
| 0 | 1 | 0 | 1 | 0 | 1 | M4 | 1 |
| 0 | 1 | 0 | 1 | 1 | 0 | M4 | 1 |
| 0 | 1 | 0 | 1 | 1 | 1 | F3 | 6 |
| 0 | 1 | 1 | 0 | 0 | 0 | F3 | 6 |
| 0 | 1 | 1 | 0 | 0 | 1 | M2 | 3 |
| 0 | 1 | 1 | 0 | 1 | 0 | M3 | 2 |
| 0 | 1 | 1 | 0 | 1 | 1 | M3 | 2 |
| 0 | 1 | 1 | 1 | 0 | 0 | DF3 | 2 |
| 0 | 1 | 1 | 1 | 0 | 1 | M2 | 3 |
| 0 | 1 | 1 | 1 | 1 | 0 | DF1 | 6 |
| 0 | 1 | 1 | 1 | 1 | 1 | F1 | 8 |

The invention claimed is:

1. A multiple output DC-DC converter comprising:
a transformer having a primary winding and at least one secondary winding;
a primary circuit comprising:
   an input that connects to a DC power supply source;
   the primary winding of the transformer; and
   a primary switch connected in series with the primary winding;
a plurality of secondary circuits, wherein each of the plurality of secondary circuits comprises the secondary winding of the transformer or a respective winding of a plurality of secondary windings of the transformer, and wherein each of the plurality of secondary circuits includes an output stage for providing a DC power supply output, wherein at least one of the secondary circuits comprises a secondary switch;
a digital controller that:
   monitors a respective output signal of each of the plurality of secondary circuits, wherein the digital controller receives one bit of feedback data for each respective output signal per monitoring period;
   generates, based on the monitored respective output signals and a respective digital representation of a desired on-off duty cycle for each of the at least one secondary circuits, a respective secondary digital control signal for each of the at least one secondary switch and a primary digital control signal; and
   controls operation of the primary switch and the at least one secondary switch using control signals derived from the respective secondary digital control signals and the primary digital control signal;
wherein the digital controller co-ordinates operation of the at least one secondary switch with the primary switch, such that the primary switch and the at least one secondary switch are switched on at the same time, or with a controlled offset; and
wherein the combined operation of the primary switch and the at least one secondary switch provides an on-off duty cycle matched to load demands of the at least one secondary switch, and wherein the controlled offset is selectable per said secondary circuit.

2. The multiple output DC-DC converter according to claim 1 wherein the digital controller operates the primary switch with a duty cycle and the digital controller operates the secondary switch of the at least one secondary circuit with a duty cycle which is different to the duty cycle of the primary switch.

3. The multiple output DC-DC converter according to claim 1, wherein the monitored output signals are indicative of loads of the secondary circuits and the digital controller operates the primary switch with a duty cycle matched to the secondary circuit having the greatest load.

4. The multiple output DC-DC converter according to claim 3 wherein, for at least one of the secondary circuits, the digital controller operates the secondary switch of the secondary circuit with a duty cycle which is shorter than the duty cycle of the primary switch.

5. The multiple output DC-DC converter according to claim 1 wherein, for at least one of the secondary circuits, the digital controller operates the secondary switch of the secondary circuit with a duty cycle based on the monitored output signal in that secondary circuit.

6. The multiple output DC-DC converter according to claim 1 wherein the transformer comprises the plurality of secondary windings, each secondary circuit comprises a respective one of the plurality of secondary windings and a primary winding/secondary winding turns ratio, and wherein at least two of the secondary circuits have a different primary winding/secondary winding turns ratio.

7. The multiple output DC-DC converter according claim 1 wherein at least two of the secondary circuits provide a different DC output voltage.

8. The multiple output DC-DC converter according claim 1, wherein at least two of the secondary circuits provide the same DC output voltage.

9. The multiple output DC-DC converter according to claim 1, wherein at least one of the secondary circuits outputs a voltage which varies over time.

10. The multiple output DC-DC converter according to claim 1, wherein the digital controller comprises:
an input to receive an input signal from an output stage of one of the secondary circuits;
a comparator to compare the input signal with a reference signal and output a comparison result;
a digital filter to filter a set of comparison results of the comparator and provide a filtered output;
a store to store a sequence of filtered outputs; and
control logic to control at least one secondary switch of the multiple output DC-DC converter based on the filtered outputs.

11. A communication apparatus comprising:
a plurality of modules, each module having a DC power supply input;
a DC-DC converter comprising:
a transformer having a primary winding and at least one secondary winding;
a primary circuit comprising:
an input that connects to a DC power supply source;
the primary winding of the transformer; and
a primary switch connected in series with the primary winding;
a plurality of secondary circuits, wherein each of the plurality of secondary circuits comprises the secondary winding of the transformer or a respective winding of a plurality of secondary windings of the transformer, and wherein each of the plurality of secondary circuits includes an output stage for providing a DC power supply output, wherein at least one of the secondary circuits comprises a secondary switch;
a digital controller that:
monitors a respective output signal of each of the plurality of secondary circuits, wherein the digital controller receives one bit of feedback data for each respective output signal per monitoring period;
generates, based on the monitored respective output signals and a respective digital representation a desired on-off duty cycle for each of the at least one secondary circuits, a respective secondary digital control signal for each of the at least one secondary switch and a primary digital control signal; and
controls operation of the primary switch and the at least one secondary switch using control signals derived from the respective secondary digital control signals and the primary digital control signal;
wherein the digital controller co-ordinates operation of the at least one secondary switch with the primary switch, such that the primary switch and the at least one secondary switch are switched on at the same time, or with a controlled offset;
wherein the combined operation of the primary switch and the at least one secondary switch provides an on-off duty cycle matched to load demands of the at least one secondary switch, and wherein the controlled offset is selectable per said secondary circuit; and
the DC-DC converter comprising a plurality of DC power supply outputs, wherein each DC power supply output of the DC-DC converter is connected to a respective DC power supply input of one of the plurality of modules.

12. The communication apparatus according to claim 11, further comprising a power management entity to determine a load demand of at least one of the plurality of modules and to cause the digital controller to activate the DC power supply outputs based on the determined load demand.

13. The communication apparatus according to claim 11, further comprising a power management entity which is to determine a load demand of at least one of the plurality of modules and to cause the digital controller to scale the DC power supply outputs based on the determined load demand.

14. A method of providing multiple DC outputs at a multiple output DC-DC converter comprising a transformer having a primary winding and at least one secondary winding, the method comprising:
monitoring, by a digital controller, a respective output signal of each of a plurality of secondary circuits, wherein the digital controller receives one bit of feedback data for each respective output signal per monitoring period, wherein the multiple output DC-DC converter includes the plurality of secondary circuits, wherein each secondary circuit comprises the at least one secondary winding of the transformer or a respective winding of a plurality of secondary windings of the transformer, and an output stage for providing a DC power supply output;
generating, based on the monitored respective output signals and a respective digital representation of a desired on-off duty cycle for each of the at least one secondary circuits, a respective secondary digital control signal for each of the at least one secondary switch and a primary digital control signal;
controlling, by the digital controller, operation of a primary switch that is connected in series with the primary winding and at least one secondary switch using control signals derived from the respective secondary digital control signals and the primary digital control signal, wherein at least one of the plurality of secondary circuits comprises the at least one secondary switch, wherein the multiple output DC-DC converter also includes a primary circuit comprising an input for connecting to a DC power supply source, the primary winding of the transformer, and wherein each of the plurality of secondary circuits includes an output stage for providing a DC power supply output, wherein at least one of the secondary circuits comprises a secondary switch;

wherein the controlling comprises co-ordinating operation of the at least one secondary switch with the primary switch, such that the primary switch and the at least one secondary switch are switched on at the same time, or with a controlled offset; and wherein the combined operation of the primary switch and the at least one secondary switch provides an on-off duty cycle matched to load demands of the at least one secondary switch, and wherein the controlled offset is selectable per said secondary circuit.

15. A non-transitory machine-readable storage medium storing instructions to co-ordinate control of a primary switch and at least one secondary switch of a multiple output DC-DC converter, the instructions that when executed by a DC-DC converter, cause the DC-DC converter to perform operations comprising:

monitoring, by a digital controller, a respective output signal of each of a plurality of secondary circuits, wherein the digital controller receives one bit of feedback data for each respective output signal per monitoring period, wherein the multiple output DC-DC converter includes the plurality of secondary circuits, wherein each secondary circuit comprises the at least one secondary winding of a transformer or a respective winding of a plurality of secondary windings of the transformer, and wherein each of the plurality of secondary circuits includes an output stage for providing a DC power supply output, wherein at least one of the secondary circuits comprises a secondary switch;

generating, based on the monitored respective output signals and a respective digital representation of a desired on-off duty cycle for each of the at least one secondary circuits, a respective secondary digital control signal for each of the at least one secondary switch and a primary digital control signal;

controlling, by the digital controller, operation of the primary switch and the at least one secondary switch using control signals derived from the respective secondary digital control signal and the primary digital control signal, wherein at least one of the plurality of secondary circuits comprises the at least one secondary switch, wherein the multiple output DC-DC converter also includes a primary circuit comprising an input connected to a DC power supply source, the primary winding of the transformer, and the primary switch, wherein the primary switch is connected in series with the primary winding;

wherein the controlling comprises a co-ordination operation of the at least one secondary switch with the primary switch, such that the primary switch and the at least one secondary switch are switched on at the same time, or with a controlled offset; and wherein the combined operation of the primary switch and the at least one secondary switch provides an on-off duty cycle matched to load demands of the at least one secondary switch, and wherein the controlled offset is selectable per said secondary circuit.

* * * * *